(12) United States Patent
Alexandre et al.

(10) Patent No.: US 12,277,466 B2
(45) Date of Patent: Apr. 15, 2025

(54) METAL ANTENNA INSERT FOR SMART CARD AND SMART CARD INCORPORATING SUCH AN ANTENNA INSERT

(71) Applicant: SMART PACKAGING SOLUTIONS, Rousset (FR)

(72) Inventors: Sautet Alexandre, Rousset (FR); Turelier Mathieu, Rousset (FR); Richard Damien, Rousset (FR)

(73) Assignee: Smart Packaging Solutions, Rousset (FR)

( * ) Notice: Subject to any disclaimer, the term of this patent is extended or adjusted under 35 U.S.C. 154(b) by 0 days.

(21) Appl. No.: 18/456,121

(22) Filed: Aug. 25, 2023

(65) Prior Publication Data
US 2024/0070433 A1   Feb. 29, 2024

(30) Foreign Application Priority Data
Aug. 25, 2022   (FR) ...................................... 2208533

(51) Int. Cl.
*G06K 19/077*   (2006.01)
*C25D 11/02*    (2006.01)
*C25D 11/04*    (2006.01)

(52) U.S. Cl.
CPC ...... *G06K 19/07779* (2013.01); *C25D 11/022* (2013.01); *C25D 11/04* (2013.01)

(58) Field of Classification Search
CPC ....... G06K 19/07779; G06K 19/07749; C25D 11/022; C25D 11/04
See application file for complete search history.

(56) References Cited

U.S. PATENT DOCUMENTS 8,534,561 B2    9/2013   Alloyez et al.
2014/0361934 A1*  12/2014  Ely .......................... C23C 16/06
                                                          343/702

FOREIGN PATENT DOCUMENTS

FR       2944122 B1    5/2011

* cited by examiner

*Primary Examiner* — Matthew Mikels
(74) *Attorney, Agent, or Firm* — McDonnell Boehnen Hulbert & Berghoff LLP

(57) ABSTRACT

The invention relates to an antenna inlay for a smart card with a contactless communication interface or a dual contact and contactless communication interface. The antenna inlay does not have a layer of plastic material, and is essentially constituted by a metal sheet comprising conductive turns delimited by zones rendered non-conductive by anodization.

20 Claims, 5 Drawing Sheets

[Fig 1A]
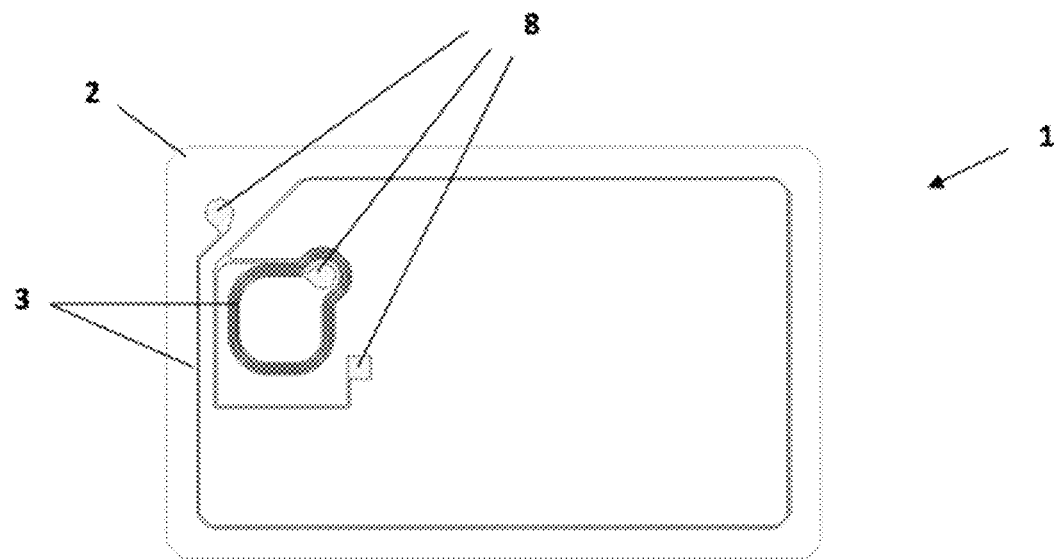
[Fig 1B]
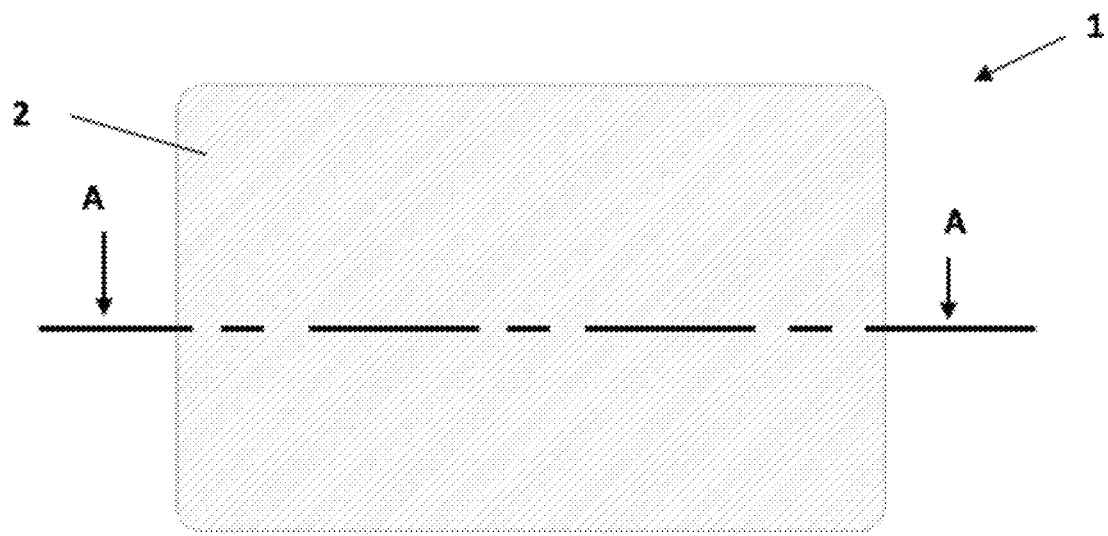

[Fig 2]
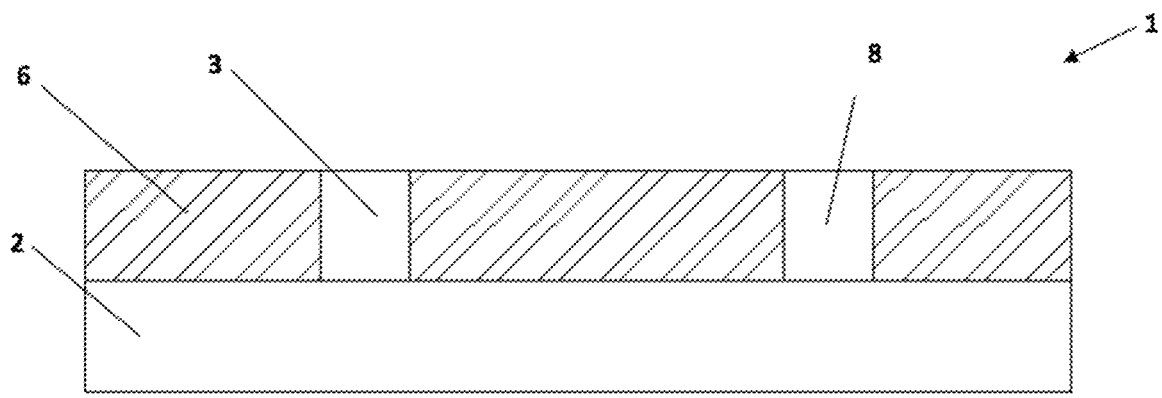
[Fig 3]
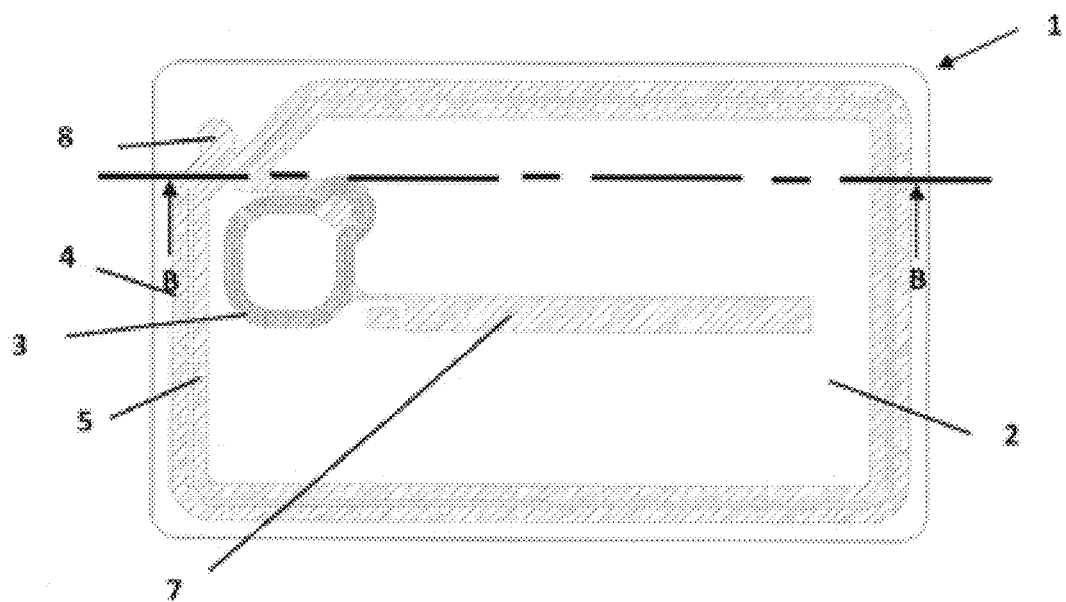

[Fig 4]
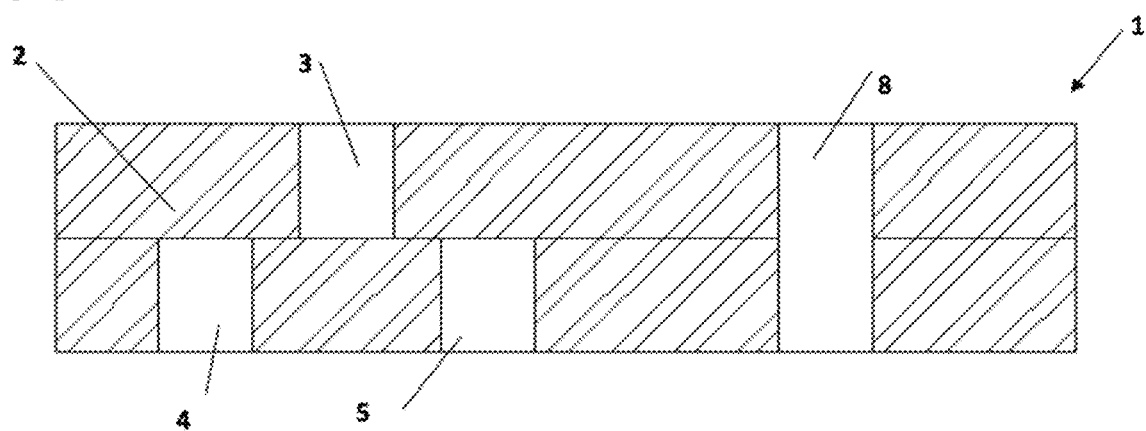

[Fig 5A]
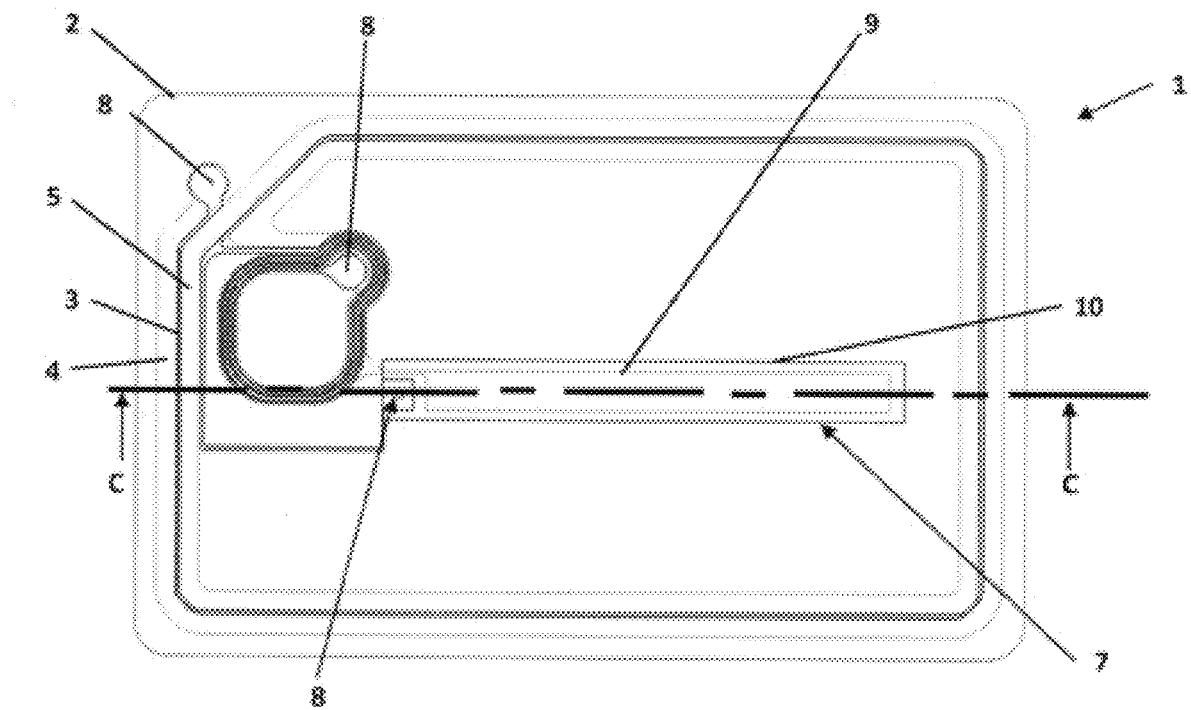
[Fig 5B]
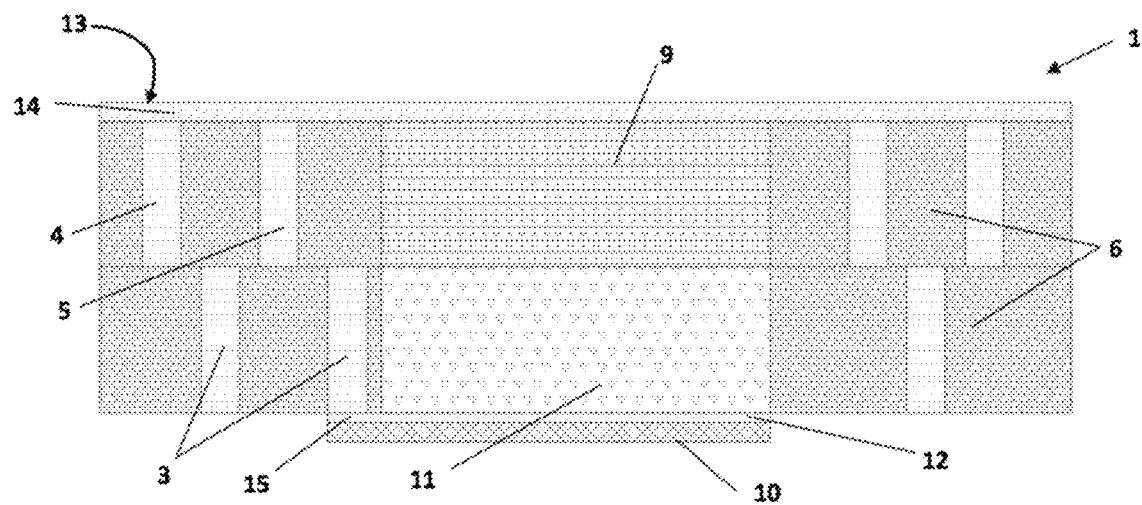

[Fig 6]
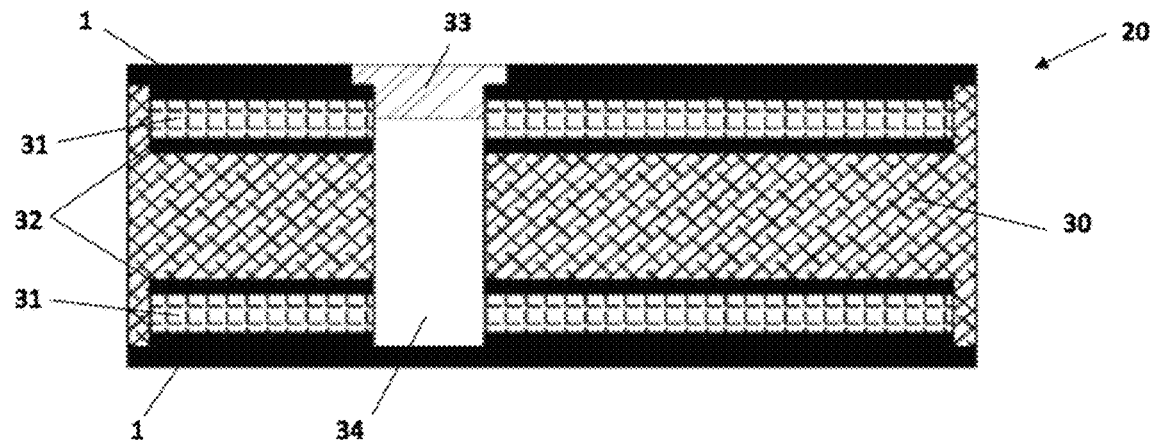
[Fig 7]
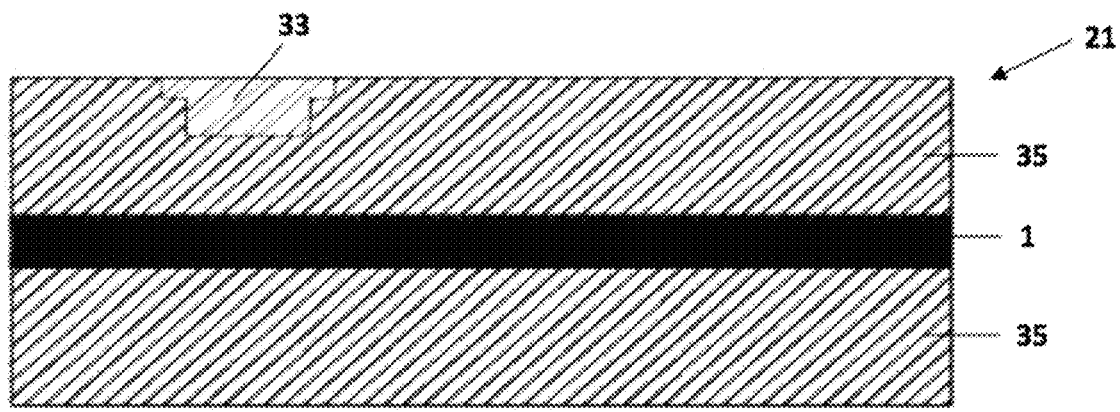
[Fig 8]
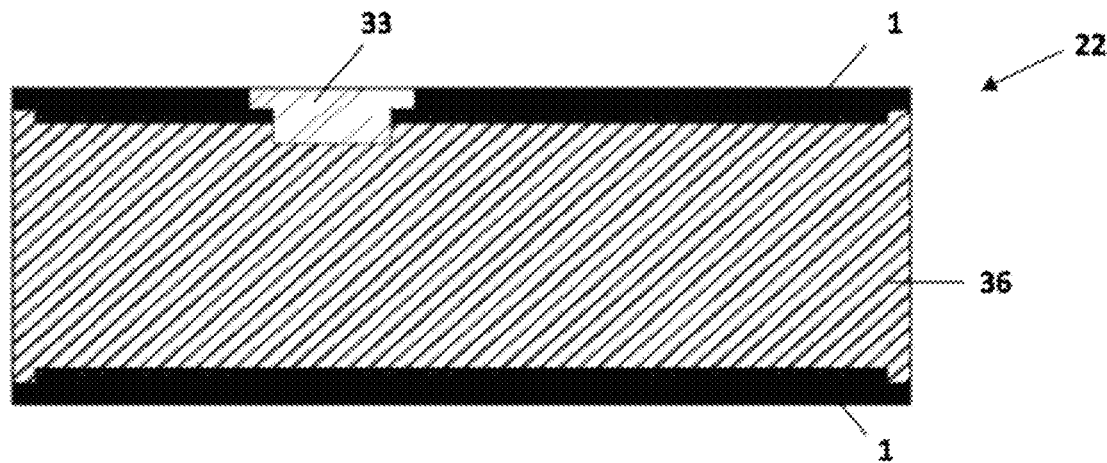

METAL ANTENNA INSERT FOR SMART CARD AND SMART CARD INCORPORATING SUCH AN ANTENNA INSERT

The present invention relates to a new antenna inlay structure for smart cards with contactless operation or with mixed contact and contactless operation, as well as a new method for producing such an antenna inlay.

PRIOR ART

For smart cards with contactless operation or dual contact and contactless operation, it is necessary to incorporate an antenna into the card body. For this purpose, antenna inlays made mainly of plastic material have long been used to ensure good radio frequency communication performance. These inlays are typically formed by a PET substrate bearing an aluminum antenna layer on each side, comprising turns made by etching the aluminum layer. This substrate is then surrounded by other layers of plastic material, the assembly being secured by lamination, to form an antenna inlay ready to be integrated between the outer layers of a card body. Such a structure is described in particular in document FR 2 944 122 B1.

However, in the field of smart cards, in particular those used for banking applications, part of the demand has for some time tended to concentrate, for reasons of better handling and increased differentiation, on heavier and more rewarding cards than traditional smart cards with a plastic body. An aspect often sought now is the noise that such a smart card must make when it is thrown on a support, which must be clearly different from the noise generated by a card essentially made of plastic material.

But the majority of metal smart cards currently on the market are still composed of a plastic part in order to guarantee suitable radio frequency communication performance. The only smart cards with a predominantly metallic structure do not meet the criteria of banking sector standards, such as the so-called EMVCo standards. It is therefore necessary to propose a new contactless smart card or with a dual communication interface having increased and more rewarding differentiation, in particular a higher weight than the known smart cards, but while still retaining its communication and ability to bear customized graphics.

PURPOSE OF THE INVENTION

The object of the invention is to propose a new smart card structure capable of satisfying the contradictory requirements of a more rewarding structure than plastic material, while having a communication capacity in contactless mode compliant with the requirements of the EMVCo type of specifications.

Another object of the invention is to provide such a smart card while retaining a structure that is simple and easy to mass-produce at a reduced cost and with very high reliability.

In particular, the aim of the invention is to propose a 100% metallic antenna inlay, capable of being integrated with a card body that is also metallic or made of a heavy, durable and high-end material, while presenting radiofrequency performance compatible with bank card standards.

SUMMARY OF THE INVENTION

The principle of the invention consists in producing antenna coils by anodizing in a sheet or in an entirely metallic block, then in assembling this entirely metallic inlay with a card body which is also metallic, or a card body formed by layers made of a material more noble than plastic, such as wood, leather, glass, porcelain, etc.

Anodizing is a surface treatment often used with aluminum, which consists in creating by electrolysis a very resistant uniform layer of aluminum oxide. Anodizing also has the property of making the anodized layer electrically insulating. Thanks to this property, the invention allows to carry out a selective anodization of the aluminum inlay, in order to delimit zones which remain conductive corresponding to the turns of an antenna, and insulating zones located between and under the turns which remain conductive.

From this all-metal inlay composed of antenna turn zones and electrically insulating zones, it is then possible to construct a new type of smart card, composed either of a metal card body and layers of ferrite interposed between the metal inlay and the metal card body, or a card body made of noble non-metallic materials such as leather, glass, porcelain, assembled with the all-metal antenna inlay.

The subject of the invention is therefore an antenna inlay for a smart card with a contactless communication interface or a dual contact and contactless communication interface, characterized in that it does not have a layer of plastic material and in that it consists essentially of a metal sheet comprising conductive coils delimited by areas rendered non-conductive by anodization.

According to one embodiment of the antenna inlay, the metal sheet is an aluminum or copper sheet, 20 to 100 micrometers thick, and whose depth of anodization from one or its two faces is between 10 and 50 micrometers.

According to an advantageous embodiment, the antenna inlay further comprises on at least one of its faces a capacitor connected to terminals of the antenna turns, said capacitor being produced by a first armature consisting of a not anodized zone of the antenna inlay, a second armature constituted by a metal pellet, and between the two armatures, a dielectric constituted by an anodized zone of the antenna inlay.

According to one embodiment, the antenna inlay comprises conductive coils on its two faces, interconnected by a via passing through the metal sheet.

According to one embodiment, all the faces of the inlay are anodized to a shallow depth (of about 10 micrometers), so as to harmonize the cosmetic appearance of the faces of the antenna inlay and to make the surface of the inlay electrically insulating and to electrically isolate the conductive coils from the surface of the inlay.

The invention also relates to a method for producing an antenna inlay as described above, characterized in that it comprises steps consisting of:
  Masking one face of the antenna inlay using a protective mask reproducing the shape of the antenna turns to be made on this face;
  Dipping the antenna inlay in an anodizing bath for a first time sufficient to anodize said face to a first depth corresponding to the desired thickness of the conductive turns;
  Removing the antenna inlay from the anodizing bath and removing the protective mask located above the conductive coils.

According to a variant of the process adapted to an inlay comprising antenna turns on its two faces, the process comprises steps consisting of:
  Masking the two sides of the antenna inlay using a protective mask reproducing the shape of the turns to be made on each side;

Dipping the antenna inlay in an anodizing bath for an initial time sufficient to anodize each side to a depth corresponding to the desired thickness of the conductive turns;

Removing the antenna inlay from the anodizing bath and removing the protective mask located above the conductive coils.

According to a preferred variant of the method according to the invention, it comprises a step consisting, after a first anodization to delimit the conductive turns, in re-immersing the antenna inlay in the anodizing bath for a second time shorter than the first time so as to superficially anodize and electrically insulate the surface of the antenna inlay overhanging the antenna turns. In this way, the turns are encapsulated and protected under an anodized layer, and the cosmetic appearance of the faces of the inlay is standardized.

The invention also relates to a smart card, characterized in that it comprises at least one antenna inlay as described above.

According to one embodiment, the smart card comprises a metallic body, and on at least one of the faces of said metallic body, an antenna inlay as described above, as well as a layer of ferrite interposed between the antenna inlay and the corresponding face of the metal body.

According to a further embodiment, the smart card comprises a body formed by two outer layers of a non-metallic and electrically insulating material, and an antenna inlay as described above, interposed and secured between said two non-metallic outer layers.

According to another alternative embodiment, the chip card comprises a body formed by a central layer of a non-metallic and electrically insulating material, interposed between two entirely metallic antenna inlays as described above.

DETAILED DESCRIPTION

The invention will be described in more detail using the drawings, in which:

FIGS. 1A, 1B show the two sides of the metal antenna inlay according to the invention comprising an antenna and an anodized area on only one side.

FIG. 2 shows a cross-sectional view along axis A-A of the antenna inlay of FIG. 1B after anodizing one side.

FIG. 3 shows the second face of the metal antenna inlay according to the invention comprising an antenna and an anodization on this second face.

FIG. 4 shows a cross-sectional view along axis B-B of the antenna inlay of FIG. 3.

FIG. 5A shows a view of the other side of the antenna inlay of FIG. 3, with the representation of the elements of a capacitor.

FIG. 5B shows a cross-sectional view along axis C-C of the antenna inlay of FIG. 5A.

FIG. 6 shows a sectional view of a first embodiment of a smart card incorporating two antenna inlays according to the invention.

FIG. 7 shows a sectional view of a second embodiment of a smart card incorporating two antenna inlays according to the invention.

FIG. 8 shows a sectional view of a third embodiment of a smart card incorporating a single antenna inlay according to the invention.

It is recalled that to produce the metal antenna inlay 1 according to the invention, the principle of anodizing a metal layer, in particular aluminum, is used.

Aluminum naturally has a superficial layer of alumina which protects it from oxidation. But this natural layer is only a few nanometers thick, and it is subject to deterioration. In order to obtain conductive tracks in an aluminum sheet, it is necessary to produce thicker and more stable non-conductive areas than a natural layer of alumina, around areas left in a non-anodized state, which therefore remain conductive.

For this purpose, it is possible to use selective anodization only at certain locations of the aluminum layer, in order to leave only certain conductive zones forming antenna turns.

To carry out the anodization of the aluminum itself, one can proceed in a known way by an electrolysis in an acid medium. In this case, the insulating layer is not made by adding material but by controlled oxidation of the substrate in order to passivate it. The nature of the anodizing baths and of the cathode can easily be adapted in the event of the use of a metal other than aluminum for the production of the antenna inlay, but in the following, the manufacturing process of an inlay made of aluminum will be described, without however limiting the invention.

The part to be anodized is placed at the anode of a direct current generator, in a tank filled with an acid medium such as sulfuric acid. The cathode of the system is usually made of lead. During electrolysis, the oxide layer builds up from the outer surface of the aluminum layer towards the core of the metal. A layer of alumina of controlled thickness is then formed which has an electrical insulating power.

Several types of anodizations can be distinguished, depending on the composition of the bath. Chromic anodization allows a deposit of a few microns. Anodizing with a sulfuric acid bath is the most appropriate for the intended application. It makes it possible to obtain insulating thicknesses of between 10 and 100 μm. Anodizing is accompanied by a change in appearance. The color of the anodized areas varies from gray to black.

Reference is made to FIG. 1. In FIG. 1A, one side of the metal antenna inlay 1 according to the invention has been depicted. This is a single-sided antenna inlay, all the antenna tracks 3 being located on the same face of the inlay 1. In this case, the antenna turns 3 are distributed on the one hand between external turns of large size, close to the periphery of the inlay 1, and on the other hand turns of a smaller size, corresponding to a concentrator or "booster" antenna which in a future smart card using the inlay 1 will be located opposite and coupled with the turns of an electronic module with contactless operation.

In order to delimit conductive antenna turns 3, one proceeds by selective anodization of the metal sheet 2 of the inlay 1, in order to make the entire metal face of the inlay non-conductive, with the exception of the zones corresponding to the turns of antenna 3.

To this end, the face of the antenna inlay 1 carrying the turns 3 is first masked with a protective mask such as a plastic film resistant to the anodizing bath, or with a printed protective resin, and the geometry of which corresponds to the geometry of the future antenna tracks 3. Then the antenna inlay 1 is immersed in an anodizing bath, for a time sufficient to carry out an anodizing of the unmasked part, to a predetermined depth, in this case about 50 micrometers maximum, or substantially half the thickness of an antenna inlay. Then the antenna inlay 1 is removed from the anodizing bath and the protective mask is removed, in particular by peeling or washing. This reveals on the previously masked face, the antenna tracks 3 which have remained conductive, as this can be seen in FIG. 2, which shows a cross-sectional view A-A of a portion of the inlay 1 after the anodizing phase of the first face (upper face). It can be seen that a passivated zone 6 (hatched zone) has been obtained over approximately the upper half of the thickness of the metal sheet 2, that is approximately 50 micrometers portion out of the 100 micrometers thickness of the inlay 1. On the upper face of the inlay 1, only the zones corresponding to the turns 3 of the single-sided antennas of the inlay remain conductive.

If it is planned to make an antenna inlay 1 with a double-sided antenna 3,4,5 as shown in FIGS. 3 and 4, it will be necessary to also mask the second face of the inlay as shown in FIG. 3, in order to be able to produce conductive tracks 4, 5 on this second face either subsequently or simultaneously, in the same way as the tracks 3 of the first face were produced in the example of FIG. 1.

In FIG. 4, a sectional view of the metal inlay 1 of FIG. 3 along axis B-B is shown after carrying out a selective anodization of the two faces. One therefore obtains an inlay provided with a double-sided antenna, with tracks 3,4,5 offset between the two faces, or which can be locally interconnected by a via 8 (FIG. 3).

Tracks 3,4,5 of the antenna correspond to the inductive and resistive part of the antenna of inlay 1. In order to adjust the resonance characteristics of the antenna, it may be necessary to add a capacitor 7 to the circuit formed by the turns. To this end, the process according to the invention provides, as shown schematically in FIGS. 5A, 5B, to arrange on at least an anodized part of one of the faces of the inlay a metal pellet 10 to form a capacitor 7 whose capacitance has a value which depends on the surface of the metal pad 10.

As we know, a capacitor is a passive electronic component made up of two conductive plates separated by a dielectric.

As shown in FIG. 5B, in the context of the present invention, in order to form the necessary capacitor 7, one proceeds as follows to obtain a double-sided metal antenna inlay 1 having antenna tracks 3,4,5 on its two sides.

First antenna tracks 4.5 are formed on a first face of the inlay, as well as a first armature 9 of the future capacitor, by a first selective anodizing of a first face of the inlay 1 (upper part of FIG. 5B).

Then, second antenna tracks 3 are formed on the second face of the inlay (lower part of FIG. 5B), as well as a dielectric zone 11 consisting of anodized and therefore insulating aluminum.

Next, a metal disc 10 is placed opposite the dielectric zone 11, which is fixed for example on the dielectric zone 11 using a layer of conductive glue 12. The stacking of the layers 9, 11, 10 thus obtained forms the structure of a capacitor 7. The armature 10 of the capacitor slightly exceeds the area of the dielectric 11 to come opposite an antenna track 3, to which it is electrically connected at 15 by the layer of conductive glue 12.

As anodizing has the effect of modifying the color of the aluminum, it may be useful for cosmetic purposes to carry out a final step of slight anodizing of the face 13 of the inlay 1 which will remain visible on the final product. This will form a thin layer 14 of anodized aluminum making it possible to standardize the appearance of this face 13 and to isolate the antenna from the outside of the card by encapsulating it under the thin layer of anodized aluminum 14. This will also have the effect of avoiding any potential short circuit between the antenna tracks 4.5 in the event of contact with an external metallic object.

It would also be possible to carry out the final anodization of the two faces during the same dipping operation, each face carrying its own mask. The control of the depth of the vias can be carried out by testing the electrical conductivity.

Once a metal antenna inlay 1 has been produced as described above, it can be used to assemble it with the layers of a card body, as represented by way of non-limiting examples in the FIGS. 6 to 8, in which the thicknesses of the layers of the chip card have been greatly exaggerated with respect to those of a real chip card, for purposes of clarity of representation.

The smart card 20 of FIG. 6 comprises a metal card body 30, and two inlays 1 according to the invention, positioned on the two faces of the card body 30 made of metal. In order to limit the influence of the metal card body 30 on the operation of the antennas of the metal inlays 1 (not shown), a layer of ferrite 31 is interposed between each antenna inlay 1 and the card body 30 made of metal. The various elements 1, 30 are secured together using thin layers of glue 32. An electronic module 33 is positioned in a known manner in a cavity 34 of the card body 30 made of metal. This is a contactless module known per se and also provided with an antenna (not shown). Insofar as, as shown, metal antenna inlays 1 are positioned on both sides of the smart card 20, the cavity 34 extends under the electronic module 33 as far as the inlay 1 of the opposite side, so that the contactless electronic module 33 can communicate with a remote contactless reader, via the antennas of each of the inlays 1 located on the upper face or on the lower face of the smart card 20. Of course, a simpler smart card structure provided with a metal antenna inlay 1 located on only one of its faces is also possible within the scope of the invention.

In the chip card 21 of FIG. 7, a metallic antenna inlay 1 according to the invention is interposed between two layers 35 of a non-metallic material, such as glass, porcelain or other noble non-metallic material. This material does not prevent a good inductive coupling between the antenna (not shown) of the electronic module 33 and the antenna or antennas (not shown) of the antenna inlay 1. No ferrite layer is necessary in this case, making it possible to obtain a particularly simple, cost effective and high-end chip card structure, depending on the material used for the layers 35.

In the smart card 22 schematically shown in FIG. 8, two metallic antenna inlays 1 in accordance with the invention are used, surrounding a non-metallic card body 36, for example made of glass, porcelain, or another non-conductive and noble material. Again, no ferrite layer is needed, the antenna of the electronic module 33 (not shown) can be coupled with the antennas of the antenna inlays 1 through the material of the card body 36.

Advantages of the Invention

The invention achieves the aimed objectives. Tests have shown that radio frequency communication with a contactless reader is of good quality regardless of the orientation of the card, and it remains compliant with EMVCo specifications.

The anodized metal faces of the smart card according to the invention are plain, without compromising the quality of radio frequency communication. They give the smart card a nice metallic appearance, which can be customized later, and a weight that meets the needs of the premium card market, as well as a good grip.

The manufacture of the monolithic metal antenna inlays is very simple and economical, and the assembly with the card body and with an electronic module uses standardized and low-cost processes.

Ultimately, the metal antenna inlay according to the invention and the smart cards which integrate it operate in the same way as the inlays with a PET core, but they are much more qualitative while respecting the radio frequency communication standards. imposed.

The invention claimed is:

1. An antenna inlay for a smart card with a contactless communication interface or a dual contact and contactless communication interface, wherein the antenna inlay is devoid of a layer made of plastic material and consists essentially of a metal sheet comprising conductive turns delimited by zones rendered non-conductive by anodization.

2. The antenna inlay according to claim 1, wherein the metal sheet is an aluminum sheet or a copper sheet, has a thickness between 50 micrometers and 100 micrometers, and has an anodization depth from one or both sides of between 10 micrometers and 50 micrometers.

3. The antenna inlay according to claim 1, further comprising, on at least one face of the antenna inlay, a capacitor connected to terminals of the conductive turns, wherein the capacitor comprises:
 a first armature constituted by a non-anodized zone of the antenna inlay;
 a second armature constituted by a metal pellet; and
 between the first armature and the second armature, a dielectric constituted by an anodized zone of the antenna inlay.

4. The antenna inlay according to claim 1, further comprising conductive turns on both faces of the antenna inlay, wherein the conductive turns are interconnected and placed in series using a via that passes through the metal sheet.

5. The antenna inlay according to claim 1, wherein all faces of the antenna inlay are anodized to a shallow depth to make a surface of the antenna inlay electrically insulating and to electrically insulate the conductive turns from the surface of the antenna inlay.

6. A method for producing the antenna inlay according to claim 1, comprising:
 masking a first face of the antenna inlay using a protective mask that reproduces a shape of the conductive turns to be made on the first face;
 masking an opposite side of the smart card when a second antenna is provided;
 dipping the antenna inlay in an anodizing bath for a first time sufficient to anodize the first face to a first depth corresponding to a desired thickness of the conductive turns; and
 removing the antenna inlay from the anodizing bath and removing the protective mask above the conductive turns.

7. The method according to claim 6, wherein the antenna inlay comprises conductive turns on both faces of the antenna inlay, and wherein the method comprises:
 masking both faces of the antenna inlay using a protective mask reproducing the shape of the conductive turns to be made on each face;
 dipping the antenna inlay in an anodizing bath for a first time sufficient to anodize each side to a depth corresponding to the desired thickness of the conductive turns; and
 removing the antenna inlay from the anodizing bath and removing the protective mask above the conductive turns.

8. The method according to claim 6, further comprising re-immersing the antenna inlay in the anodizing bath for a second time to superficially anodize and electrically insulate a surface of the antenna inlay overhanging the conductive turns, wherein the second time is shorter than the first time.

9. A smart card with a contactless communication interface or a dual contact and contactless communication interface, wherein the smart card comprises:
 an antenna inlay devoid of a layer made of plastic material, wherein the antenna inlay consists essentially of a metal sheet comprising conductive turns delimited by zones rendered non-conductive by anodization.

10. The smart card according to claim 9, further comprising a metallic body, wherein on at least one face of the metallic body, a layer of ferrite is interposed between the antenna inlay and the face of the metallic body.

11. The smart card according to claim 9, further comprising a body formed by two outer layers of a non-metallic and electrically insulating material, wherein the antenna inlay is interposed and secured between the two outer layers.

12. The smart card according to claim 9, further comprising:
 a body formed by a central layer of a non-metallic and electrically insulating material; and
 an additional antenna inlay devoid of a layer made of plastic material,
 wherein the additional antenna inlay consists essentially of an additional metal sheet comprising additional conductive turns delimited by additional zones rendered non-conductive by anodization, and
 wherein the central layer is interposed between the antenna inlay and the additional antenna inlay.

13. The smart card according to claim 9, wherein the metal sheet is an aluminum sheet or a copper sheet, has a thickness between 50 micrometers and 100 micrometers, and has an anodization depth from one or both sides of between 10 micrometers and 50 micrometers.

14. A smart card with a contactless communication interface or a dual contact and contactless communication interface, wherein the smart card comprises:
 an antenna inlay devoid of a layer made of plastic material, wherein the antenna inlay consists essentially of:
 a metal sheet comprising conductive turns delimited by zones rendered non-conductive by anodization; and
 on at least one face of the antenna inlay, a capacitor connected to terminals of the conductive turns, wherein the capacitor comprises:
 a first armature constituted by a non-anodized zone of the antenna inlay;
 a second armature constituted by a metal pellet; and
 between the first armature and the second armature, a dielectric constituted by an anodized zone of the antenna inlay.

15. The smart card according to claim 14, wherein the metal sheet is an aluminum sheet or a copper sheet, has a thickness between 50 micrometers and 100 micrometers, and has an anodization depth from one or both sides of between 10 micrometers and 50 micrometers.

16. The smart card according to claim 14, further comprising conductive turns on both faces of the antenna inlay, wherein the conductive turns are interconnected and placed in series using a via that passes through the metal sheet.

17. The smart card according to claim 14, wherein all faces of the antenna inlay are anodized to a shallow depth to make a surface of the antenna inlay electrically insulating and to electrically insulate the conductive turns from the surface of the antenna inlay.

18. The smart card according to claim 14, further comprising a metallic body, wherein on at least one face of the metallic body, a layer of ferrite is interposed between the antenna inlay and the face of the metallic body.

19. The smart card according to claim 14, further comprising a body formed by two outer layers of a non-metallic and electrically insulating material, wherein the antenna inlay is interposed and secured between the two outer layers.

20. The smart card according to claim 14, further comprising:
- a body formed by a central layer of a non-metallic and electrically insulating material; and
- an additional antenna inlay devoid of a layer made of plastic material,
- wherein the additional antenna inlay consists essentially of an additional metal sheet comprising additional conductive turns delimited by additional zones rendered non-conductive by anodization, and
- wherein the central layer is interposed between the antenna inlay and the additional antenna inlay.

* * * * *